(12) United States Patent
Wong

(10) Patent No.: US 8,406,806 B2
(45) Date of Patent: Mar. 26, 2013

(54) MOBILE TELEPHONE CAPABLE OF AUTOMATICALLY SWITCHING ANTENNA ACCORDING TO USER'S HAND POSITION

(75) Inventor: Siu Ling Wong, Shatin (HK)

(73) Assignee: Smartech Worldwide Limited, Hong Kong (CN)

( * ) Notice: Subject to any disclaimer, the term of this patent is extended or adjusted under 35 U.S.C. 154(b) by 299 days.

(21) Appl. No.: 12/885,716

(22) Filed: Sep. 20, 2010

(65) Prior Publication Data

US 2012/0071203 A1   Mar. 22, 2012

(51) Int. Cl.
H04M 1/00   (2006.01)

(52) U.S. Cl. .................................... 455/550.1

(58) Field of Classification Search ............... 455/550.1
See application file for complete search history.

(56) References Cited

U.S. PATENT DOCUMENTS

| | | | |
|---|---|---|---|
| 7,392,030 B2 | 6/2008 | Sunaga | |
| 2006/0084395 A1* | 4/2006 | Kezys et al. | 455/101 |
| 2007/0241977 A1* | 10/2007 | Vance | 343/745 |
| 2008/0115844 A1* | 5/2008 | Teichmann et al. | 137/557 |
| 2008/0246723 A1* | 10/2008 | Baumbach | 345/156 |
| 2009/0047645 A1* | 2/2009 | Dibenedetto et al. | 434/258 |
| 2010/0321034 A1* | 12/2010 | Hargreaves | 324/612 |

* cited by examiner

Primary Examiner — Yuwen Pan
Assistant Examiner — Fatuma Sherif
(74) Attorney, Agent, or Firm — SV Patent Service

(57) ABSTRACT

A mobile communication device includes a first antenna configured to transmit and receive RF signals, a first capacitive sensor adjacent to the first antenna, a second antenna configured to transmit and receive RF signals, a second capacitive sensor adjacent to the second antenna, a sensing circuit in communication with the first capacitive sensor and the second capacitive sensor, the sensing circuit being that can determine the position of a user's hand adjacent to the first antenna or the second antenna in response to sensing signals received from the first capacitive sensor and the second capacitive sensor, and an antenna switching circuit that can select the first antenna or the second antenna to transmit and receive RF signals to enable wireless communications in response to the position of the user' hand relative to the first antenna and the second antenna as determined by the sensing circuit.

12 Claims, 5 Drawing Sheets

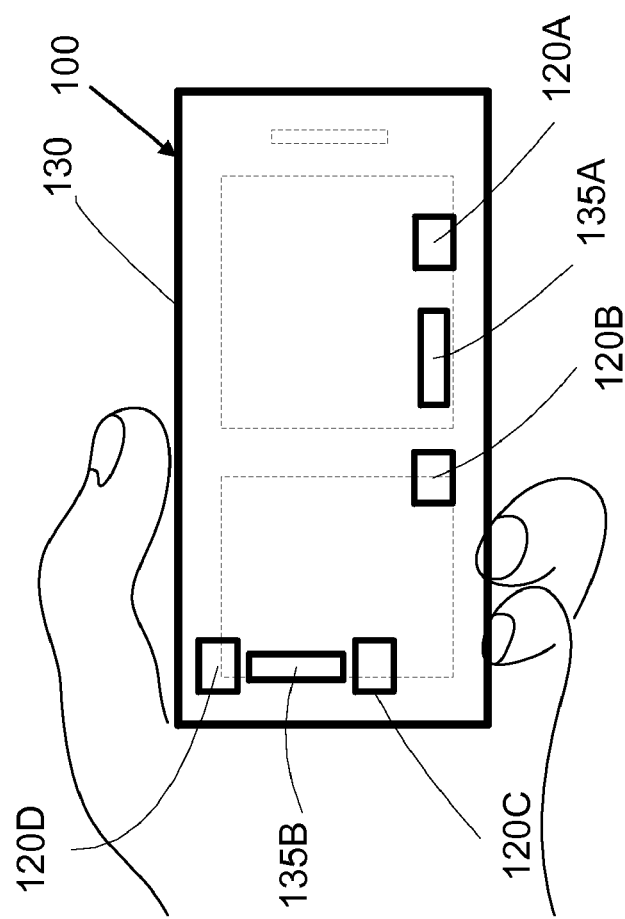
Figure 3A
Figure 3B
Figure 3C

MOBILE TELEPHONE CAPABLE OF AUTOMATICALLY SWITCHING ANTENNA ACCORDING TO USER'S HAND POSITION

BACKGROUND

The present disclosure relates to mobile communication devices such as mobile telephones.

A typical mobile telephone composes of a body and an antenna which is usually placed inside the mobile telephone. When a user holds the mobile telephone closed to the antenna, the user's hand acts as a dielectric medium that attenuates RF signals, which can cause the reception and the transmission performance of the mobile telephone to deteriorate. It is therefore desirable to design the position of the antenna of a mobile telephone so that the antenna is away from a user's hand, arm, or other parts of the body, to avoid interference to the reception and transmission RF signals. However, modern mobile telephones have a wide range of designs and users may hold mobile telephones in many different ways. Such design efforts often cannot cover all mobile configurations and hand positions. RF communications can still be affected when a user's hand holds a mobile telephone at certain specific positions.

Therefore, there is a need for a mobile telephone that can provide high quality RF signals regardless of the position of a user's hand holding the telephone.

SUMMARY OF THE INVENTION

The disclosed systems and methods allow a user to hold a mobile telephone in a wide range of positions without affecting the transmission and reception performance of the mobile telephone. When a user's hand holding a mobile telephone covers an antenna in a mobile telephone, the disclose systems and methods can detect the position of the user's hand on or near the telephone, and automatically switch to a different antenna that is not covered by the user's hand.

The disclosed mobile telephone includes can include one or more capacitive sensors that can accurately determine the position of user' hand or other body part relative to the mobile phone. The capacitive sensors can detect the movements of user's hand and dynamically switch antenna to achieve RF transmission and reception with the highest fidelity.

In a general aspect, the present invention relates to a mobile communication device that includes a first antenna configured to transmit and receive RF signals; a first capacitive sensor adjacent to the first antenna; a second antenna configured to transmit and receive RF signals; a second capacitive sensor adjacent to the second antenna; a sensing circuit sensing circuit in communication with the first capacitive sensor and the second capacitive sensor, the sensing circuit being configured to determine the position of a user's hand adjacent to the first antenna or the second antenna in response to sensing signals received from the first capacitive sensor and the second capacitive sensor; and an antenna switching circuit configured to select the first antenna or the second antenna to transmit and receive RF signals to enable wireless communications in response to the position of the user' hand relative to the first antenna and the second antenna as determined by the sensing circuit.

Implementations of the system may include one or more of the following. The antenna switching circuit can select the second antenna to transmit and receive RF signals when the sensing circuit determines that the user' hand is adjacent to the first antenna and is away from the second antenna. The sensing circuit can measure a first capacitance of the first capacitive sensor and a second capacitance of the second capacitive sensor, wherein the antenna switching circuit is configured to select the first antenna or the second antenna to transmit and receive RF signals in response to the first capacitances and the second capacitance obtained by the sensing circuit. The mobile communication device can further include an oscillator configured to generate a first oscillating signal applied to the first capacitive sensor and a second oscillating signal applied to the second capacitive sensor, wherein the sensing circuit is configured to measure the frequencies of the first oscillating signal and the second oscillating signal. The first capacitance of the first capacitive sensor can change when a user's hand is positioned adjacent to the first antenna. The frequency of the first oscillating signal can change when a user's hand is positioned adjacent to the first antenna, wherein the sensing circuit can measure the change in the frequency of the first oscillating signal when a user's hand is positioned adjacent to the first antenna. The antenna switching circuit can switch the transmission and reception of the RF signals from the first antenna to the second antenna when the conversion circuit determines that the frequency of the first oscillating signal changes by a predetermined amount or to a predetermined threshold value.

In another general aspect, the present invention relates to a mobile communication device that includes a first antenna configured to transmit and receive RF signals; a first sensor adjacent to the first antenna; a second antenna configured to transmit and receive RF signals; a second sensor adjacent to the second antenna; a sensing circuit in communication with the first sensor and the second sensor, the sensing circuit being configured to determine the position of a user's hand adjacent to the first antenna or the second antenna in response to sensing signals received from the first sensor and the second sensor; and an antenna switching circuit configured to select the first antenna or the second antenna to transmit and receive RF signals to enable wireless communications in response to the position of the user' hand relative to the first antenna and the second antenna as determined by the sensing circuit.

In another general aspect, the present invention relates to a mobile communication device that includes a first antenna configured to transmit and receive RF signals; a second antenna configured to transmit and receive RF signals; a capacitive sensor; a signal generating circuit configured to produce a sensing signal to be applied to the capacitive sensor; a sensing circuit configured to determine the position of a user's hand adjacent to the first antenna or the second antenna based on the sensing signal received from the capacitive sensor; and an antenna switching circuit that can select the first antenna or the second antenna to transmit and receive RF signals to enable wireless communications in response to the position of the user' hand relative to the first antenna and the second antenna as determined by the sensing circuit.

Implementations of the system may include one or more of the following. The antenna switching circuit can select the second antenna to transmit and receive RF signals when the sensing circuit determines that the user' hand is adjacent to the first antenna and is away from the second antenna. The sensing circuit can determine a change in a capacitance of the capacitive sensor based on the sensing signal, wherein the antenna switching circuit is configured to select the first antenna or the second antenna to transmit and receive RF signals in response to the change in the capacitances determined by the sensing circuit. The sensing signal can be an oscillating signal. The sensing circuit can measure the frequency of the oscillating signal. The antenna switching circuit can switch the transmission and reception of the RF signals from the first antenna to the second antenna when the conversion circuit determines that the frequency of the first oscillating signal changes by a predetermined amount or to a predetermined threshold value. The capacitance of the first capacitive sensor can change when a user's hand is positioned adjacent to the first antenna.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 3A illustrates a user's hand holding the mobile phone at a second position.

FIGS. 3B and 3C show the different frequencies of the oscillating electric signals detected by capacitive sensors located at different positions of the mobile phone in FIG. 3A.

DETAILED DESCRIPTION OF THE INVENTION

Figure 1:
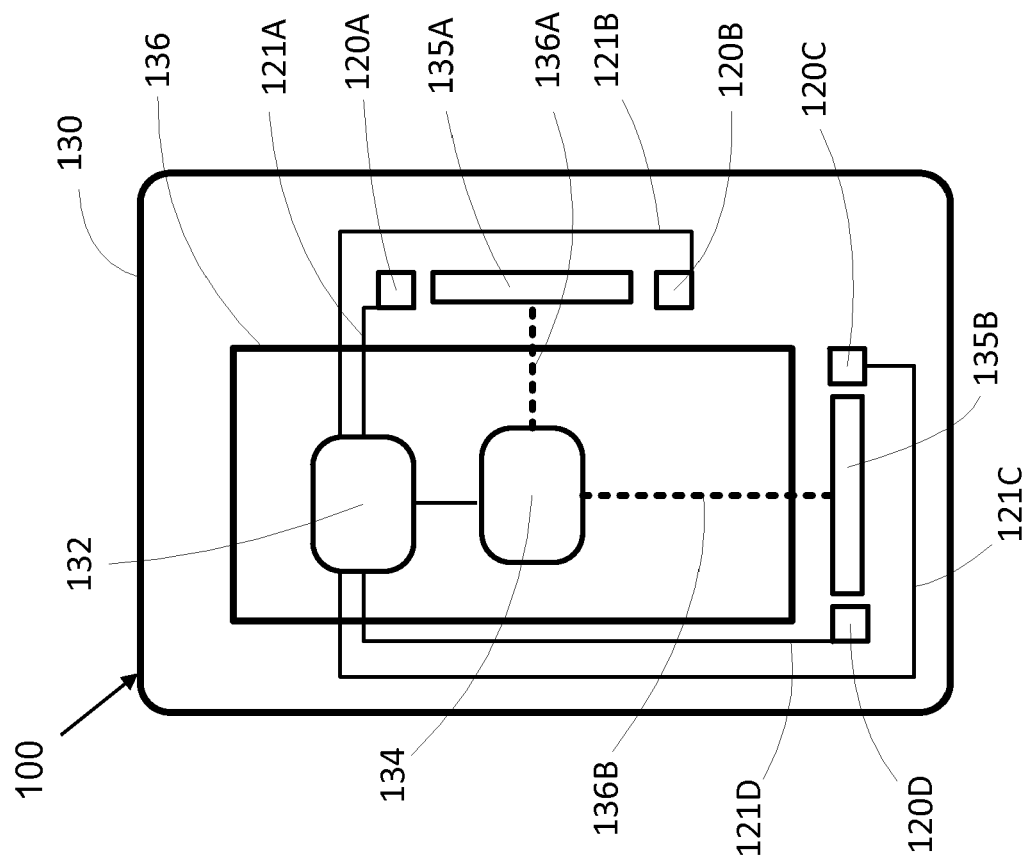
FIG. 1 is a planar view of a mobile phone having multiple antennas and multiple of capacitive sensors in accordance with the present invention.

Referring to FIG. 1, a mobile telephone 100 includes case 130, capacitive sensors 120A-120D, a circuit board 136, and antennas 135A, 135B. The capacitive sensors 120A, 120B are adjacent to the antenna 135A and are configured to detect user's hand covering the antenna 135A. The capacitive sensors 120C, 120D are adjacent to the antenna 135B and are configured to detect user's hand covering the antenna 135B. The circuit board 136 includes a sensing circuit 132 and an antenna switching circuit 134. The sensing circuit 132 is connected to the capacitive sensors 120A-120D by connector wires 121A-121D respectively. The sensing circuit 132, which can also be referred to as the sensing circuit, can receive sensing signals from the capacitive sensors 120A-120D, the sensing signals being associated with the changes in the capacitances of the capacitive sensors 120A-120D. The antenna switching circuit 134 is in communication with the sensing circuit 136 and connected to the antennas 135A and 135B by the connector wires 136A, 136B respectively. Either antennas 135A, 135B can transmit and receive wireless RF signals for wireless communications. The antennas 135A, 135B can be positioned at different positions from the one shown in FIG. 1. The antennas 135A, 135B are so positioned that at least one of them is not covered by user's hand in the typical hand holding positions.

The mobile telephone 100 further includes a memory (not shown), a power amplifier circuit (not shown) coupled to the antenna 135,135B for amplifying transmission and reception RF signals. The mobile telephone 100 includes an RF transceiver (not shown), coupled to the power amplifier circuit, for up and down convert between RF signals modulated signals. A base band processor (not shown) in communication with the RF transceiver can process digital signals necessary for wireless communications.

The capacitive sensors 120A-120D and the sensing circuit 132 can automatically detect the position of the user's hand holding the mobile phone 100. The antenna switching circuit 134 can switch between antenna 135A, 135B in response to the position of the user's hand detected by the capacitive sensors 120A-120D and the sensing circuit 132.

A problem for mobile telephone devices, as described above, is that when a user holds the mobile telephone close to the antenna, the user's hand acts as a dielectric medium and attenuates the RF signals, which can deteriorate the quality of the RF signals. In accordance to the present invention, the capacitive sensors 120A-120D are so located to detect the position of a user's hand holding the mobile phone and if the hand covers one of the antennas. The capacitive sensors 120A-120D can be made of different materials and calibrated to be most sensitive to human hand. The capacitive sensors 120A-120D can be integrated into the same circuit board (136) that includes the sensing circuit 132.

It should be noted that the positions of the antennas 135A, 135B shown in FIG. 1 are for illustration purpose. The disclosed mobile phone can include two, three or more capacitive sensors to accurately determine user's hand positions. The disclosed mobile phone can include also two, three or more antennas for providing flexibility to steer wireless transmission and reception away from user's hand. The capacitive sensors can be of small size, different geometries, and a variety of shapes and dimensions.

In some embodiments, each capacitive sensor 120A-120D can include a single electrode that determines that the capacitance of the respective capacitive sensor 120A-120D. The capacitive 120A-120D can take many different shapes and placed in different locations of the mobile phone 100. In some embodiments, the mobile phone is compatible with a capacitive sensor comprising more than one electrode.

Figure 2A:
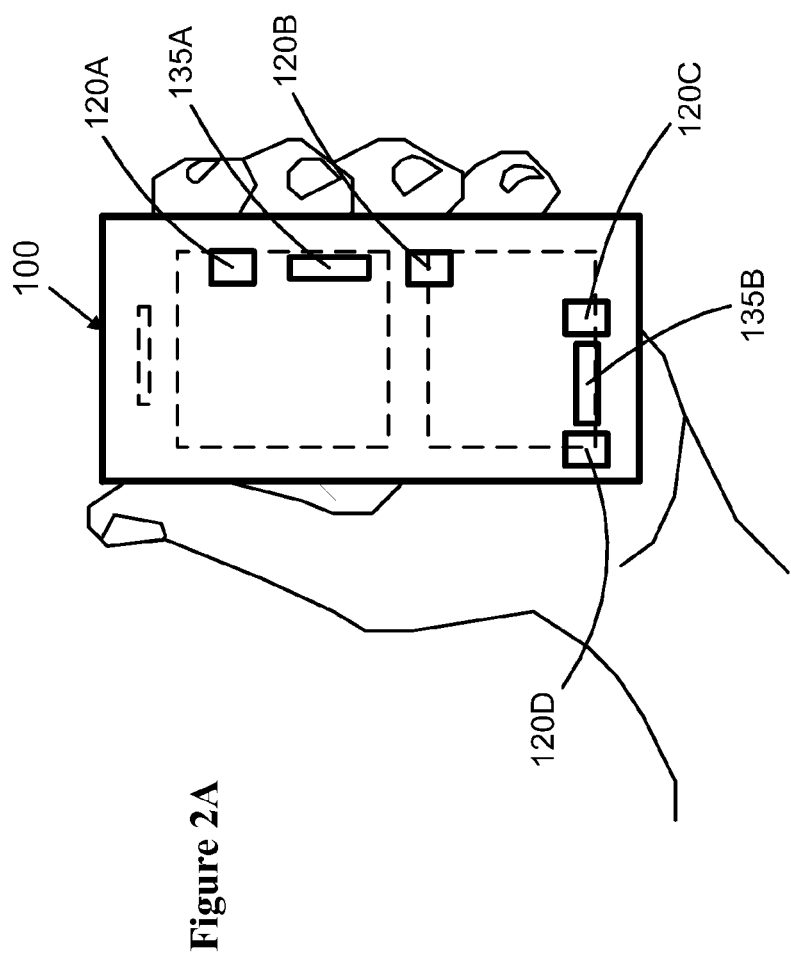
FIG. 2A illustrates a user's hand holding the mobile phone at a first position.

The capacitor sensors 120A-120D can work as touch sensors or proximity sensors that detect when user's hand or other body part (such as arms, head, etc.) touches or comes to proximity of the mobile phone 100. Each capacitive sensor 120A-120D can determine the presence or absence of the user's hand near the mobile phone 100 by detecting the change in their respective capacitances. When the user's hand is far from the mobile phone 100, each capacitive sensor 120A-120D has a base capacitance contributed by the GROUND on the circuit board 136, etc. When the mobile phone 100 is touched by user's hand in a position as shown in FIG. 2A, the capacitive sensors 120A and 120B are closer to the user's hand and they gain additional capacitances due to the increased dielectric constant in the capacitive sensor. The capacitive sensors 120C and 120D are further away from the user's hand and thus gain less or little capacitance. As a result, the oscillating signal 210 (i.e. an example of the sensing signals) from the capacitive sensors 120A or 120B has an increased frequency while the oscillating signal 220 (i.e. an example of the sensing signals) from the capacitive sensors 120C or 120D has frequency little changed.

Similarly, when the mobile phone 100 is held by the user's hand in another position as shown in FIG. 3A, the capacitive sensor 120C and 120D are closer to user's hand and gain additional capacitances. The capacitive sensors 120A and 120B are farther away from the user's hand and gain little or no capacitances. As a result, the oscillating signal 320 from the capacitive sensors 120C or 120D has an increased frequency while the oscillating signal 310 from the capacitive sensors 120A or 120B has frequency little changed.

Detailed disclosure about capacitive sensors on a mobile phone is also disclosed in the commonly assigned U.S. patent application Ser. No. 12/854,294, titled "Mobile telephone enabling a user to answer a call without pressing a button", filed on Aug. 11, 2010, by the same inventor, the disclosure of which is disclosed herein by reference.

Figure 4:
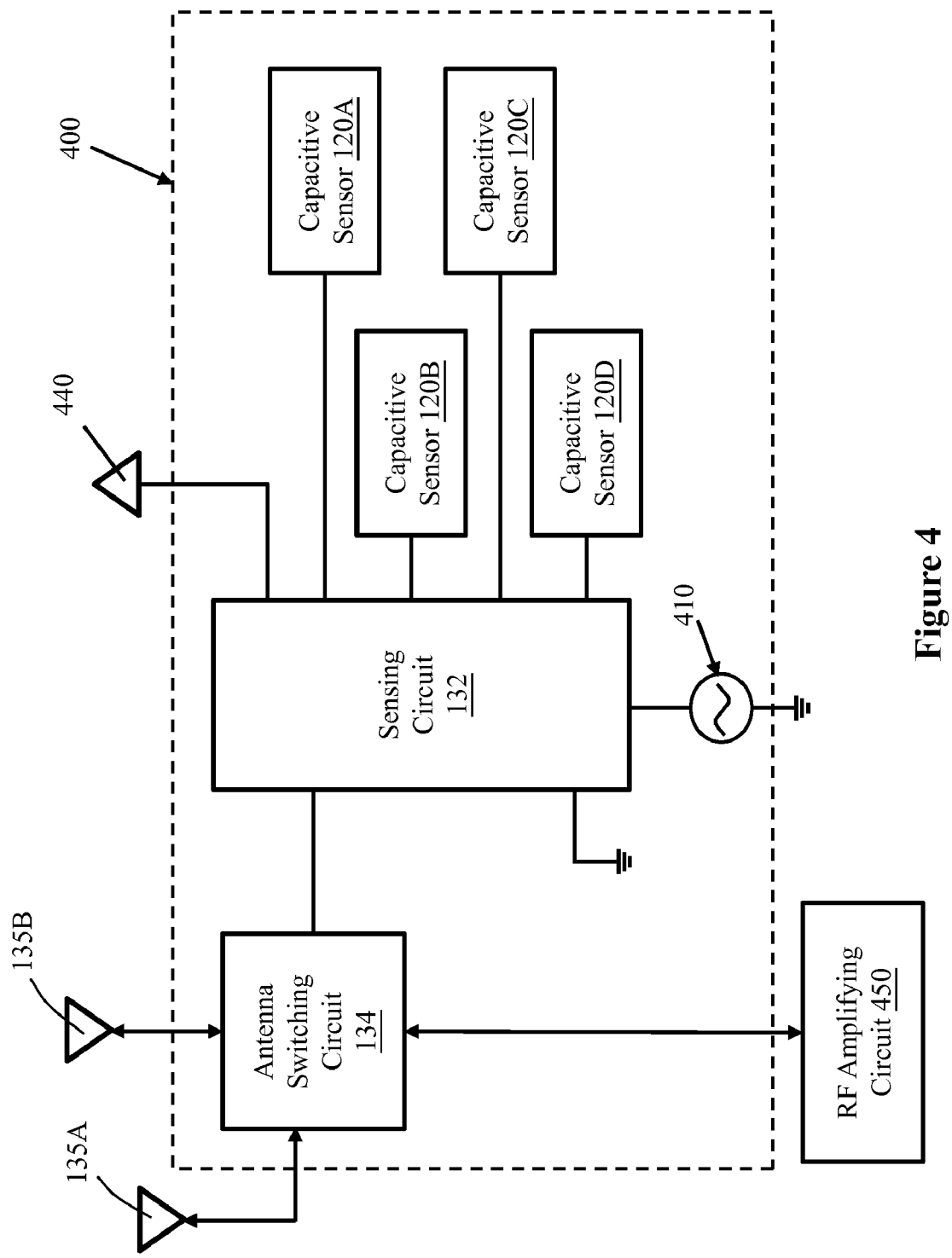
FIG. 4 illustrates an exemplified dynamic antenna control circuit that can detect positions of a user's hand holding the mobile phone and for switching antenna according to the user's hand positions.

FIG. 4 shows an exemplified dynamic antenna control circuit 400 compatible with the mobile phone 100 in FIGS. 1, 2A and 3A. The sensing circuit 132 is connected to a voltage supply 440, ground, and capacitive sensors 120A-120D. An oscillator 410 is configured to apply an oscillating signal to the capacitive sensors 120A-120D. The oscillator 410 can be internal or external to the dynamic antenna control circuit 400. In general, a signal generator can be implemented in place of the oscillator 410. The signal generator can generate a range of waveforms comprising oscillating signals.

The sensing circuit 132 can also be connected to other components such as resistor, a capacitor, etc. The sensing circuit 132 is in communication with the antenna switching circuit 134 that can control the switching of the antenna 135A and 135B. The transmission RF is received from an RF amplifying circuit 450, which is coupled to an RF transceiver (not shown) and then a baseband processor (not shown). The reception RF signal is also sent to the RF amplifying circuit 450 for amplification.

The capacitance of the capacitive sensor 120A-120D is dependent on the object around it. The capacitive sensors 120A-120D can detect changes in capacitances in their respective environments. When the user's hand moves to the vicinity of one of the capacitive sensor 120A-120D, the air next to the capacitive sensor 120A-120D is replaced by the user's hand. The change in dielectric constant induced by the user's hand can cause a change in the capacitance in the capacitive sensor 120A-120D. The capacitance change in the capacitive sensor 120A-120D can result in a change in the frequencies of the oscillating signals from the respective sensors, as shown in FIGS. 2B, 2C, 3B, 3C, which can be detected by the sensing circuit 132. The changes in the frequencies of the oscillating signals are used to determine the position of the user's hand relative to the antenna 135A and 135B.

In operation, an oscillating electric signal at a certain frequency is sent to each of the capacitive sensors 120A-120D, which produces an electromagnetic field around each sensor. When a user's hand is moved into the electromagnetic field around one of the capacitive sensors 120A-120D, the dielectric constant and thus the capacitance changes for that sensor, which in turn changes the frequency of the oscillating electric signal, as shown in FIGS. 2B, 2C, 3B, 3C. The sensing circuit 132 is configured to measure the frequency of the oscillating electric signal, and convert the measured frequency to a capacitance value in the capacitive sensor 120A-120D. The conversion can be conducted using a pre-calibrated relationship between the oscillating frequency and capacitance of known object near or in touch of the mobile phone.

A change in the frequency can thus be used as an indicator for the presence of a user's hand in the proximity of the antenna 135A or 135B. A user's hand is determined to be adjacent to the antenna 135A or 135B when the capacitance of the capacitive sensor changes by a predetermined amount or reaches a predetermined value. Once the user's hand is detected near the antenna 135A or 135B, the sensing circuit 132 sends a control signal to the antenna switching circuit 450 which can switch to an antenna away from the user's hand to ensure high fidelity wireless communications.

Figure 2C:
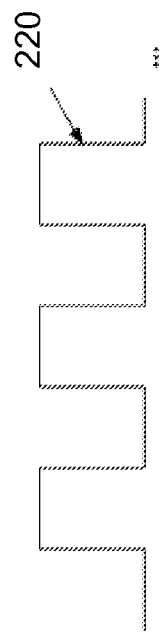
FIGS. 2B and 2C show the different frequencies of the oscillating electric signals detected by capacitive sensors located at different positions of the mobile phone in FIG. 2A.
Figure 2B:
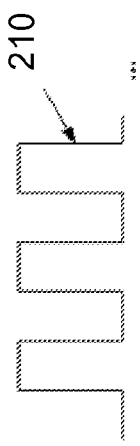

Referring to FIGS. 2A-2C, the user's hand is touching the mobile phone in areas close to the capacitive sensors 120A, 120B. The user's hand is farther away from the capacitive sensors 120C, 120D. As a result, the capacitances of the capacitive sensors 120A, 120B significantly increase while the capacitances of the capacitive sensors 120C, 120D have little increase. The frequency of the oscillating signal 210 from the capacitive sensors 120A, 120B thus increases while the oscillating signal 220 from the capacitive sensors 120C, 120D have about the same frequencies. The sensing circuit 132 can measure the absolute frequency value or the change in frequency, and calculate the change in the capacitance in the capacitive sensors 120A-120D to determine the position of the user's hand relative to the mobile phone 100.

When the sensing circuit 132 determines that the user's hand is in the vicinity of the capacitive sensors 120A, 120B while the capacitive sensors 120C, 120D and the antenna 135B are farther away from user's hand, the sensing circuit 132 sends a control signal to the antenna switching circuit 134 which in turn switches the wireless operations (transmission and reception) from the antenna 135A to the antenna 135B. As a result, the quality of the reception and the transmission of the wireless signals are much improved.

In some embodiments, the antenna switching circuit 134 is configured to switch the transmission and reception of the RF signals from the antenna 135A to the antenna 135B when the sensing circuit 132 determines the frequency of the oscillating signal 210 changes by a predetermined amount or to a predetermined threshold value. The predetermined amount or the predetermined threshold value can indicate how close the user's hand is to the antenna 135A and thus can predict how much degradation that the user's hand can cause in the wireless transmission and reception by the antenna 135A.

Referring to FIGS. 3A-3C, the user's hand is touching the mobile phone near the capacitive sensors 120C, 120D. The user's hand is farther away from the capacitive sensors 120A, 120B. As a result, the capacitances of the capacitive sensors 120C, 120D increase while the capacitances of the capacitive sensors 120A, 120B have little change. The frequencies of the oscillating signal 310 from the capacitive sensors 120A, 120B stay about the same while the frequency of the oscillating signal 320 from the capacitive sensors 120C, 120D increases.

The sensing circuit 132 can measure the absolute frequency value or the change in frequency, and calculate the change in the capacitance in the capacitive sensors 120A-120D to determine that the user's hand is adjacent to the capacitive sensors 120C, 120D and likely covers the antenna 135B. In addition, the sensing circuit 132 can also determine that the capacitive sensors 120A, 120B are away from user's hand and the antenna 135A is not blocked by the user's hand. The sensing circuit 132 sends a control signal to the antenna switching circuit 134 which in turn switches the wireless transmission and reception from the antenna 135B to the antenna 135A. The quality of the reception and the transmission of the wireless signals are much improved.

It should be noted that depending on the design of the dynamic antenna control circuit, the proximity of a user's hand to a capacitive sensor can increase or decrease the frequency of the oscillation signal from the capacitive sensor. The presently disclosed mobile device is compatible with circuit designs that can detect frequency changes in either direction.

The antenna switching can be dynamic. Users often change hand positions during a mobile phone conversation. As a user's hand blocks different antennas while freeing up other antennas, the sensing circuit 132 can detect the change in position with the capacitive sensors. The antenna switching circuit 134 can switch antennas accordingly to avoid the user's hand.

In some embodiments, the sensing circuit 132 and the antenna switching circuit 134 can be implemented in separate circuits. Alternatively, the logic functions of the two circuits can be integrated in a single integrated circuit (IC), or combined with other wireless communication functions such as power amplification, RF transceiver, base band processing, and other control and sensing (e.g. camera or micro phone) functions. The computation of capacitance using frequency of the oscillating signal can be executed on the sensing circuit or by a different processing or micro controller. A conversion look-up table can also be stored on a memory in the mobile phone 100.

Figure 5:
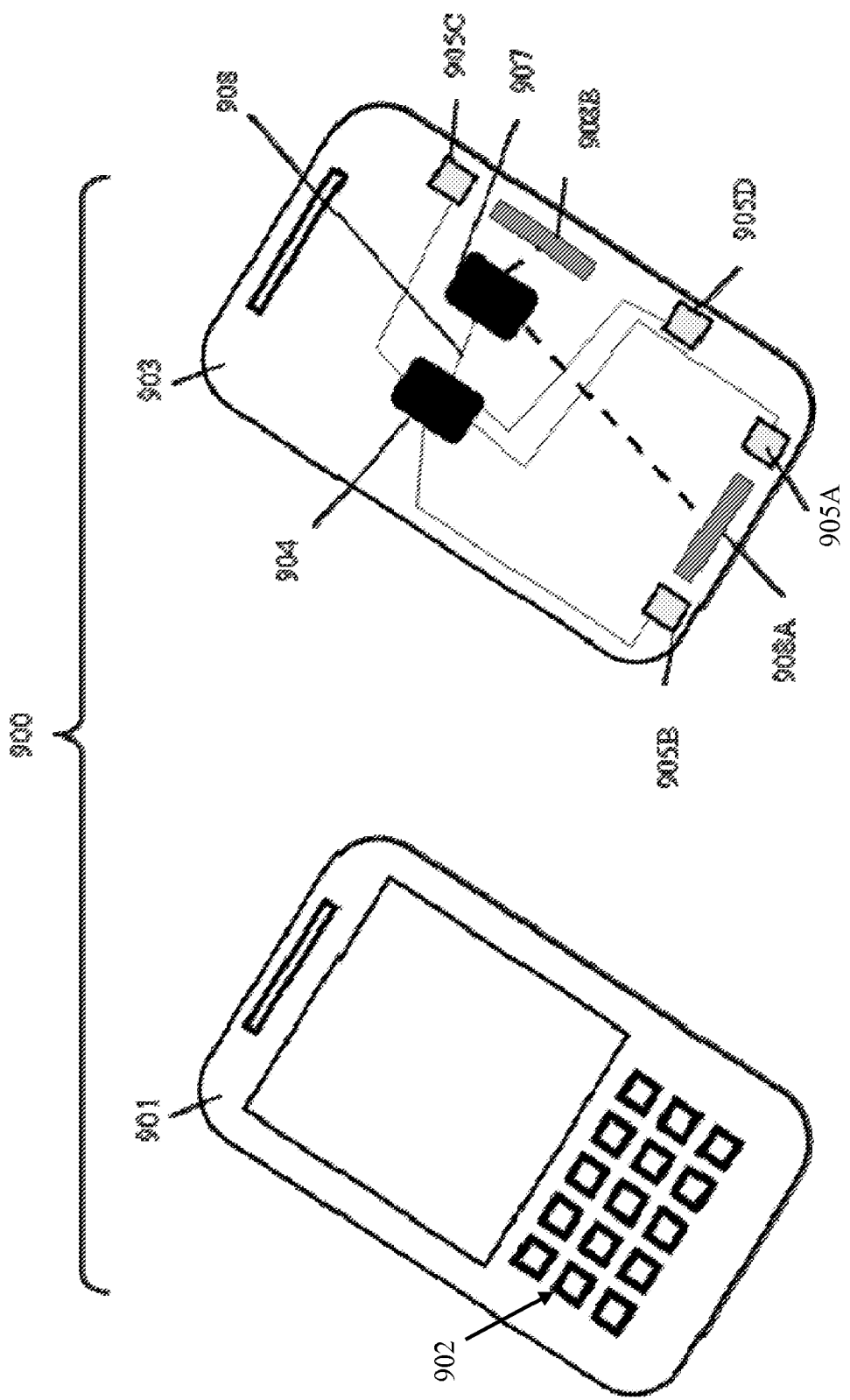
FIG. 5 is an exploded planar view of another example of a mobile phone having multiple antennas and multiple of capacitive sensors in accordance with the present invention.

In some embodiments, referring to FIG. 5, a mobile phone 900 includes a case 901 with a key pad 902 and a circuit board 903 under the case 901. The mobile phone 900 includes a plurality of sensors 905A-905D at different locations for detecting user's hand that holds or is in the proximity of the mobile phone 900. The sensors 905A-905D can include capacitive sensors, as disclosed above, as well as pressure sensors, temperature sensors, and optical-mechanical sensors, or a combination of these sensors.

A sensing circuit 904 on the circuit board 903 is connected to the sensors 905A-905D. An antenna switching circuit 907 on the circuit board 903 is configured to control the switching wireless operations between two antennas 908A and 908B. The sensors 905A, 905B are configured to sense a user's hand adjacent to the antenna 908A. The sensors 905C, 905D are configured to sense a user's hand adjacent to the antenna 908B. The sensing circuit 904 is configured to determine the position of the user's hand by analyzing the signals from the sensors 905A-905D. The antenna switching circuit 907 is in communication with the sensing circuit 904 by a connecting wire 908.

In wireless operations, as described above, an oscillating signal is directed to each of the sensors 905A-905D. The frequency of the oscillating signals is respectively measured. The capacitance or a change in capacitance in each of the sensors 905A-905D is computed by the sensing circuit 904. The change in capacitance is used to determine if a user's hand is adjacent to each of the sensors 905A-905D and the antenna 908A, 908B.

It is understood that the disclosed circuit and methods are compatible with other configurations of the electronic components and variations in circuit designs without deviation from the spirit of the present specification. The presently disclosed apparatus is applicable to different types of telecommunication devices such as cell phones, cordless phone, family radio service (FRS), Walkie-talkie, etc.

Furthermore, the disclosed capacitive sensing circuit and the dynamic antenna control circuit in the disclosed mobile phone are intended to illustrate, and not to limit, the present invention. Many other circuit designs can achieve the described functions while still compatible with the present invention. The capacitances of the capacitive sensors can also be measured in different manners. For example, different waveforms can be used for sensing the user's hand, which can include oscillating signals or other signals.

What is claimed is:

1. A mobile communication device, comprising:
a first antenna configured to transmit and receive RF signals, wherein the first antenna comprises a first elongated portion and two ends;
a first pair of sensors adjacent to the first antenna, wherein the first pair of sensors are respectively located adjacent to the two ends of the first antenna;
a second antenna configured to transmit and receive RF signals, wherein the second antenna comprises a second elongated portion and two ends;
a second pair of sensors adjacent to the second antenna, wherein the second pair of sensors are respectively located adjacent to the two ends of the second antenna;
a sensing circuit in communication with the first pair of sensors and the second pair of sensors, the sensing circuit being configured to determine the position of a user's hand relative to the first antenna or the second antenna in response to signals received from the first pair of sensors and the second pair of sensors; and
an antenna switching circuit configured to select the first antenna or the second antenna to transmit and receive RF signals to enable wireless communications in response to the position of the user' hand relative to the first antenna and the second antenna as determined by the sensing circuit.

2. The mobile communication device of claim 1, wherein the antenna switching circuit is configured to select the second antenna to transmit and receive RF signals when the sensing circuit determines that the user' hand is adjacent to the first antenna and is away from the second antenna.

3. The mobile communication device of claim 1, wherein the first pair of sensors and the second pair of sensors are capacitive sensors, wherein the sensing circuit is configured to receive signals in association with changes in a first capacitance of the first pair of sensors and a second capacitance of the second pair of sensors, wherein the antenna switching circuit is configured to select the first antenna or the second antenna to transmit and receive RF signals in response to the first capacitances and the second capacitance obtained by the sensing circuit.

4. The mobile communication device of claim 3, further comprising an oscillator configured to generate a first oscillating signal applied to the first pair of sensors and a second oscillating signal applied to the second pair of sensors, wherein the sensing circuit is configured to measure the frequencies of the first oscillating signal and the second oscillating signal.

5. The mobile communication device of claim 4, wherein the antenna switching circuit is configured to switch the transmission and reception of the RF signals from the first antenna to the second antenna when the conversion circuit determines that the frequency of the first oscillating signal changes by a predetermined amount or to a predetermined threshold value when the user's hand moves to the proximity of the first pair of sensors.

6. A mobile communication device, comprising:
a first antenna configured to transmit and receive RF signals, wherein the first antenna comprises a first elongated portion and two ends;
a first pair of capacitive sensors adjacent to the first antenna, wherein the first pair of capacitive sensors are respectively located adjacent to the two ends of the first antenna;
a second antenna configured to transmit and receive RF signals, wherein the second antenna comprises a second elongated portion and two ends;
a second pair of capacitive sensors adjacent to the second antenna, wherein the second pair of capacitive sensors are respectively located adjacent to the two ends of the second first antenna;

a sensing circuit in communication with the first pair of capacitive sensors and the second pair of capacitive sensors, the sensing circuit being configured to determine the position of a user's hand relative to the first antenna or the second antenna in response to sensing signals received from the first pair of capacitive sensors and the second pair of capacitive sensors; and an antenna switching circuit configured to select the first antenna or the second antenna to transmit and receive RF signals to enable wireless communications in response to the position of the user' hand relative to the first antenna and the second antenna as determined by the sensing circuit.

7. The mobile communication device of claim 6, wherein the antenna switching circuit is configured to select the second antenna to transmit and receive RF signals when the sensing circuit determines that the user' hand is adjacent to the first antenna and is away from the second antenna.

8. The mobile communication device of claim 6, wherein the sensing circuit is configured to determine a change in a first capacitance of the first pair of capacitive sensors and/or a second capacitance of the second pair of capacitive sensors based on the sensing signals, wherein the antenna switching circuit is configured to select the first antenna or the second antenna to transmit and receive RF signals in response to the change in the first capacitances and/or the second capacitance determined by the sensing circuit.

9. The mobile communication device of claim 8, further comprising an oscillator configured to generate a first oscillating signal applied to the first pair of capacitive sensors and a second oscillating signal applied to the second pair of capacitive sensors, wherein the sensing circuit is configured to measure the frequencies of the first oscillating signal and the second oscillating signal.

10. The mobile communication device of claim 9, wherein the first capacitance of the first pair of capacitive sensors is configured to change when a user's hand is positioned adjacent to the first antenna.

11. The mobile communication device of claim 9, wherein the frequency of the first oscillating signal changes when a user's hand is positioned adjacent to the first antenna, wherein the sensing circuit is configured to measure the change in the frequency of the first oscillating signal when a user's hand is positioned adjacent to the first antenna.

12. The mobile communication device of claim 10, wherein the antenna switching circuit is configured to switch the transmission and reception of the RF signals from the first antenna to the second antenna when the conversion circuit determines that the frequency of the first oscillating signal changes by a predetermined amount or to a predetermined threshold value.

\* \* \* \* \*